(12) United States Patent
Runnestrand et al.

(10) Patent No.: US 6,393,365 B1
(45) Date of Patent: May 21, 2002

(54) COHERENCY STACK OF SEISMIC TRACES

(75) Inventors: Scott A. Runnestrand; Edgar L. Butler; Dennis B. Neff, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/538,377

(22) Filed: Mar. 29, 2000

(51) Int. Cl.$^7$ .................................................. G01V 1/28
(52) U.S. Cl. ...................................................... 702/17
(58) Field of Search ........................ 702/14, 17, 18; 367/45, 73, 52, 43, 60, 59

(56) References Cited

U.S. PATENT DOCUMENTS

| | | | | |
|---|---|---|---|---|
| 4,397,006 A | | 8/1983 | Galbraith, Jr. ............... | 367/40 |
| 4,476,551 A | * | 10/1984 | Ruehle ......................... | 367/43 |
| 4,802,146 A | * | 1/1989 | Moeckel ....................... | 367/51 |
| 4,882,713 A | | 11/1989 | Hughes ......................... | 367/47 |
| 4,884,248 A | * | 11/1989 | Laster et al. .................. | 367/43 |
| 4,905,204 A | | 2/1990 | Hughes ......................... | 367/62 |
| 5,051,963 A | | 9/1991 | Linville, Jr. et al. .......... | 367/46 |
| 5,392,213 A | | 2/1995 | Houston et al. ............. | 364/421 |
| 5,572,483 A | * | 11/1996 | Chambers et al. ............ | 367/21 |

* cited by examiner

Primary Examiner—Donald E. McElheny, Jr.
(74) Attorney, Agent, or Firm—George E. Bogatie

(57) ABSTRACT

A method for suppressing noise in a common depth point gather of seismic data traces is disclosed in which noisy data traces are detected and muted by a sequence of data processing steps prior to making a final stack of the data traces.

22 Claims, 4 Drawing Sheets

COHERENCY STACK OF SEISMIC TRACES

This invention relates generally to analysis and suppression of seismic noise, and more specifically to a computer program-implemented method and apparatus for automatically reducing noise in seismic trace stacking operations.

BACKGROUND OF THE INVENTION

For many years seismic exploration for oil and gas has involved the use of a source of seismic energy and its reception by an array of seismic detectors, which are referred to as geophones when used on land and as hydrophones when used offshore. On land the source of seismic energy can be a high explosive charge electrically detonated in a borehole located at a selected point on a terrain, or another energy source having capacity for delivering a series of impacts or mechanical vibrations to the earth's surface. The acoustic waves generated in the earth by these sources propagate downwardly, and are reflected from subterranean strata boundaries or other formation discontinuities and are transmitted back to the surface. Multiple reflections reach the surface of the earth at varying intervals of time, depending on the distance and the characteristics of the subsurface traversed. These multiple returning waves are detected by the geophones, which function to transduce such acoustic waves into representative continuous analog electrical signals depicting amplitude versus time, and the thus detected signals are referred to as data traces. Accordingly, each trace records more than one reflection event.

In use on land an array of geophones is laid out along a grid covering an area of interest to form a group of spaced apart observation stations within a desired locality to enable construction of three dimensional (3D) views of reflector positions over wide areas. The source, which is offset a desired distance from the geophones, injects acoustic signals into the earth, and the detected signals at each geophone in the array are recorded for later processing using digital computers where the analog data is generally quantized as digital sample points at regular intervals, e.g., a time sample every two or four milliseconds, such that each time sample point may be operated on individually. Accordingly, continuously recorded seismic field traces are reduced to two dimensional (2D) vertical cross sections or horizontal map views, or 3D volume views, all of which approximate subsurface structure. The geophone array is then moved along to a new position and the process is repeated to complete a seismic survey. Accordingly, a seismic survey is data gathered at the surface and presented as a data representation of a portion of the subsurface.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, and the traces are grouped such that the reflections can be assumed to have been reflected from a particular point within the earth, e.g., a common depth point (CDP) or a common midpoint. Often the group will include thirty or more traces reflected from the CDP. The individual records or "traces" are then corrected for the differing distance the seismic energy travels through the earth from the corresponding shotpoints, downwardly to the common depth point, and then upwardly to the various geophones. This step includes correction for the varying velocities through rock layers of different types and changes in the source and receiver depths. The correction for the varying spacing of shotpoint/geophone pairs is referred to as a normal move out (NMO), and after application of NMO each trace is the one that would have been produced by a coincident source and geophone. After this is done, the group of signals from the various common depth points are summed, and the resulting summed trace is referred to hereinafter as a "pilot" trace. Because the seismic signals are of a sinusoidal nature, this summation process serves to significantly reduce random noise in the seismic record, and thus increases its signal-to-noise ratio. This process is referred to as the "stacking" of CDP data, and is well known to those skilled in the art.

Another type of noise, which is referred to as coherent noise, is generated by the seismic source and travels mostly in the weathered layer. The strongest noise of this type is a noise train, which is called "ground-roll" by the geophysicists. Other sources of coherent noise, which often distort the field records and depth point gathers, include side-swipe or out-of-plane noise, and multiples (i.e., signals which have been reflected more than once). Noise reduction through the stacking process, however, is severely compromised in the event of certain circumstances including: presence of coherent noise since this noise is not random, and presence of low amplitude reflection signals. Presence of coherent noise in the seismic data can result in non-interpretable sections when the coherent noise masks underlying primary reflections.

Many types of noise filters and trace muting schemes have been developed to address the problem of coherent noise in seismic data. A significant problem with these known filters, however, is that user intervention is required to define a corridor or a specific time/trace position where the filter or mute pattern is to be applied.

Accordingly, it is an object of this invention to minimize user intervention in a scheme for filtering noise through a data processing sequence applied to NMO corrected CDP gathers.

Another object is to effectively eliminate noise in seismic data while minimizing any effects on the signal.

A more specific object of this invention is to optimize a stack of seismic traces utilizing a trace muting scheme that automatically tests all traces of a gather at each time sample, and mutes segments of traces having waveform shapes which are a minority compared to the entire gather.

Yet another object of this invention is to accentuate low amplitude reflectors.

SUMMARY OF THE INVENTION

According to the present invention, the foregoing and other objects and advantages are attained in a computer program-implemented method for attenuating noise through data processing steps which includes muting of noise containing signals and stacking of coherent-signal data traces. The method involves automatically comparing each trace in an NMO corrected CDP gather to a pilot trace resulting from a standard stack of the gather, so as to determine a numerical value representative of similarity of each NTMO corrected trace of the gather to the pilot trace. Subsequent steps, according to the invention, involve: muting of NMO corrected traces which lack sufficient similarity to the pilot trace, and restacking the remaining coherent-signal dominated traces to provide a noise filtered trace.

In a presently preferred embodiment of this invention, waveform comparison of the pilot trace with an NMO corrected trace of the CDP gather is made at each time sample, and over a user selected time period for a sliding window. This window is centered about the time sample point being compared, and is then sequentially incremented a number of times necessary to compare traces over a relatively long period (i.e. for the full time or depth of interest). Trace muting is applied to the time samples of the NMO corrected trace corresponding to the current time sample in the window, and then continues on a point by point basis as the sliding window is incremented along the traces being compared. After completing the muting scheme for a CDP gather, the remaining unmuted traces of the CDP gather, which are now dominated by coherent signal traces, are stacked to provide a coherency stack trace. This process is continued until all CDP gathers of the seismic survey have been processed, and thus to provide a coherency stack volume.

Also as presently preferred, the comparisons are made using an extended correlation algorithm that considers both shape and absolute amplitude of the waveforms being compared and determines a numerical similarity factor. This similarity factor is referred to herein as an RB-factor. Accordingly, a numerical RB-factor is assigned to each time sample of the each CDP gathered trace so that the time samples can be ranked according to the RB-factor, and time samples that fail to meet a user defined threshold are muted. The unmuted traces at each time sample are restacked and stored for further use, and the sliding window is incremented to the next time sample.

In accordance with another aspect of this invention, the apparatus comprises a computer programmed to automatically compare, rank, mute, and restack unmuted traces of a predefined CDP gather according to the above described method, and to output the noise filtered traces.

The method and apparatus of this invention determines whether or not a specific time sample of a trace contains signal waveforms that are predominately noise by using the extended RB-correlation algorithm for comparing each NMO corrected trace in the CDP gather with a standard pilot trace of the gather, and then uses a muting scheme to eliminate noisy traces. Surprisingly, the muting scheme also accentuates signals from low amplitude reflectors, as will be illustrated hereinafter. The method of this invention thus tests all traces of a gather and selects the coherent-signal dominated traces of the gather for the stacking process.

Still other objects and advantages of the present intention will become readily apparent to those skilled in the art from the following detailed description and the drawings, wherein there is shown and described only the preferred embodiments of this invention. As will be realized by those skilled in the art, this invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
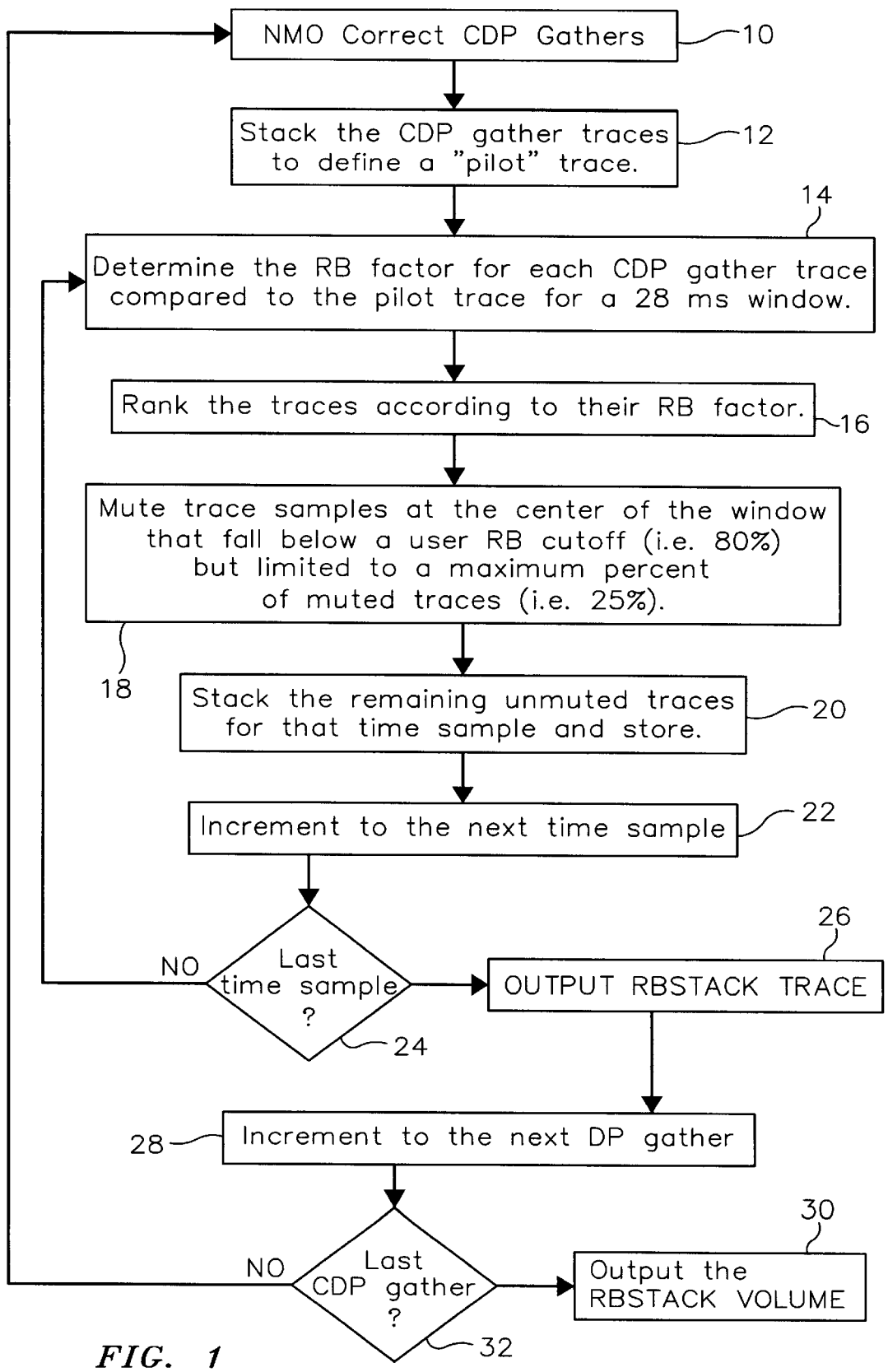
FIG. 1 is a simplified flow diagram illustrating the presently preferred data processing steps, which sequence of processing steps function as a noise filter according to this invention.

The method of this invention assumes that conventional data processing has been applied to the field data up to and including normal move out, NMO, of common depth point, CDP, gathered seismic data traces as indicated at 10 in FIG. 1. In step 12, a "pilot" trace is defined, which is a single trace obtained by summing all of the individual NMO corrected traces in the CDP gather. As previously mentioned, this summing process is effective for attenuating some random noise, but is less effective for reducing coherent noise.

In step 14 of FIG. 1, the RB-correlation algorithm is applied in crosscorrelating a segment of each trace of the CDP gather with the corresponding segment of the pilot trace over a user defined sliding time window, preferably of about twenty-eight milliseconds, and which as previously mentioned, is centered about the time sample being analyzed. The RB-correlation algorithm used to determine signal coherency among the traces of the CDP gather, applies the well known normalized correlation coefficient, which is a measure of linear relationship between two waveforms, in combination with a normalized absolute amplitude difference term as follows:

Given two time series ($a_i$ and $b_i$) of length N, the normalized correlation coefficient ($X_{(ab)}$) is calculated as follows:

$$X_{(a,b)} = \frac{\sum_{i=1}^{N} a_i \cdot b_i}{\sqrt{\sum_{i=1}^{N} a_i^2} \cdot \sqrt{\sum_{i=1}^{N} b_i^2}} \quad (1)$$

where the length N is a comparison window corresponding to the selected time (or depth) interval of interest. The normalized amplitude difference ($D_{(a,b)}$) is defined as follows:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)} \quad (2)$$

This equation yields a difference coefficient that is similar in form to the normalized correlation coefficient in that two identical waveforms being compared will yield a coefficient of unity. The extended correlation referred to as the RB-correlation algorithm, is then defined as the weighted average of the two above measures as follows:

$$RB_{(a,b)} = wX_{(a,b)} + (1-w)D_{(a,b)} \quad (3)$$

where w is a weighting factor between zero and one, and is commonly set to one-half for equal weighting between shape and absolute amplitude.

The programmed method of this invention then proceeds to step 16, where each of the waveform comparisons at the time samples is ranked according to its numerical RB-factor, and trace waveforms in the time window failing to surpass a user defined RB-factor threshold are muted. In practice of this invention, a threshold value of about eighty percent for the RB-factor is common, and the percent of muted traces at a given time sample is commonly limited to about twenty-five percent. In step 20, the remaining unmuted waveform traces for the current time sample are stacked and then stored for further processing.

The program then proceeds to step 22, where the center of the sliding time window is incremented (i.e. usually incremented by two or four milliseconds) to the next time sample. Next at step 24, the program discriminates as to whether or not all time samples for the current CDP gather have been processed, and if not the program returns to step 14 for analysis of the next time sample. If all of the time samples for the traces being compared have been processed, the program proceeds to step 26, where a coherency-stack trace referred to an RBSTACK-TRACE is output.

Next in step 28, the program obtains the next CDP gather for processing in a like manner. In step 32, the program discriminates as to whether or not all of the CDP gathers of the seismic survey have been processed. And if so, the program outputs a coherency stack volume in step 30 referred to as an RBSTACK-VOLUME, which includes RBSTACK-TRACES derived from all of the CDP gathers. If all of the CDP gathers have not been processed, the program returns to step 10 for processing the next CDP gather.

Figure 2:
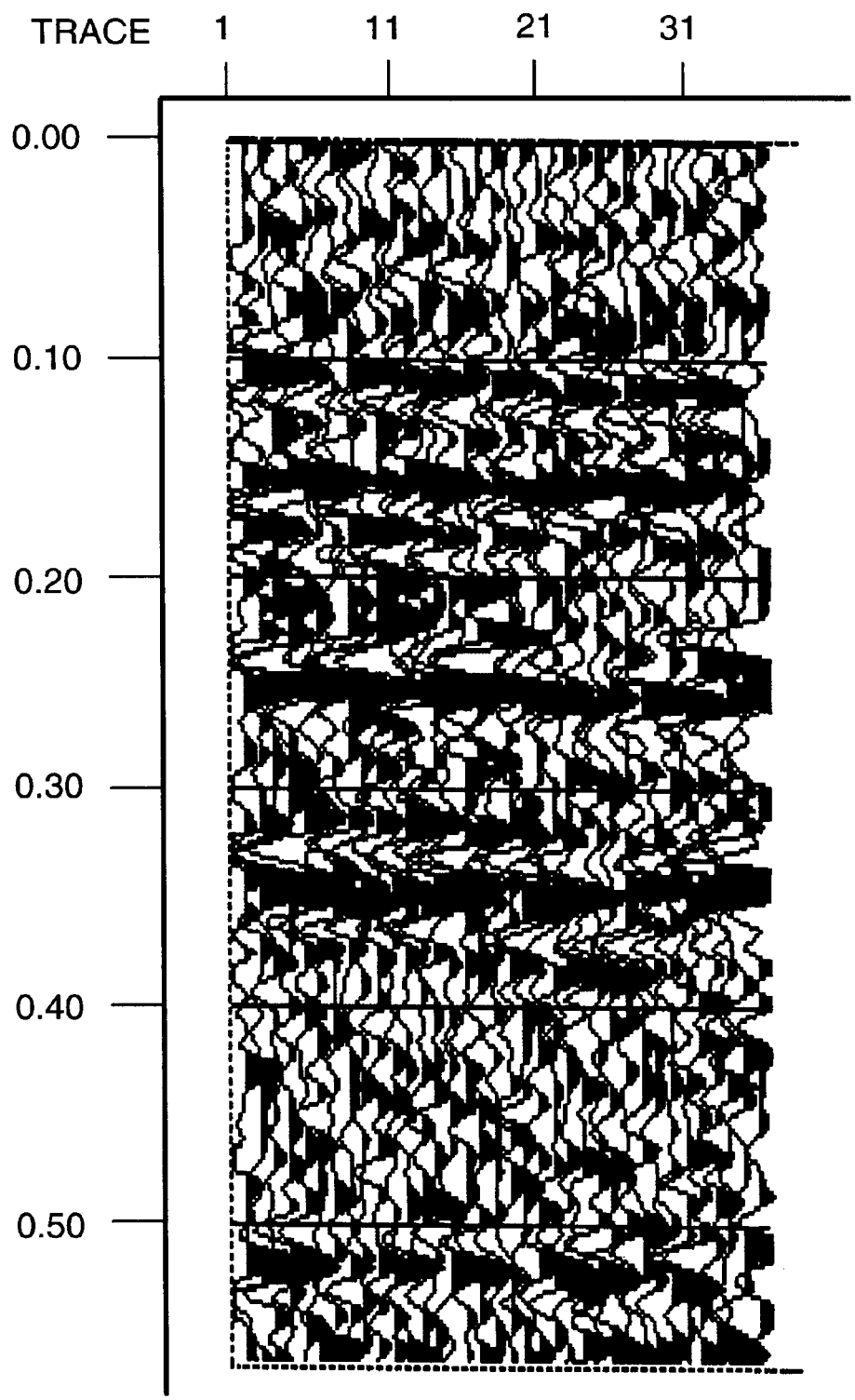
FIG. 2 is a 36-trace NMO corrected CDP gather suitable for input data to the processing steps of FIG. 1.

Referring now to FIG. 2, there is illustrated a 36-trace gather where each trace is reflected from a common depth point. This figure has trace numbers indicated on the horizontal axis and reflection time in seconds indicated on the vertical axis. As illustrated, the gather has been corrected for NMO as is well known in the art, and is suitable as an input CDP gather for the processing steps of FIG. 1. Gathers that include more or fewer traces are also acceptable for the processing in accordance with FIG. 1.

Figure 3A:
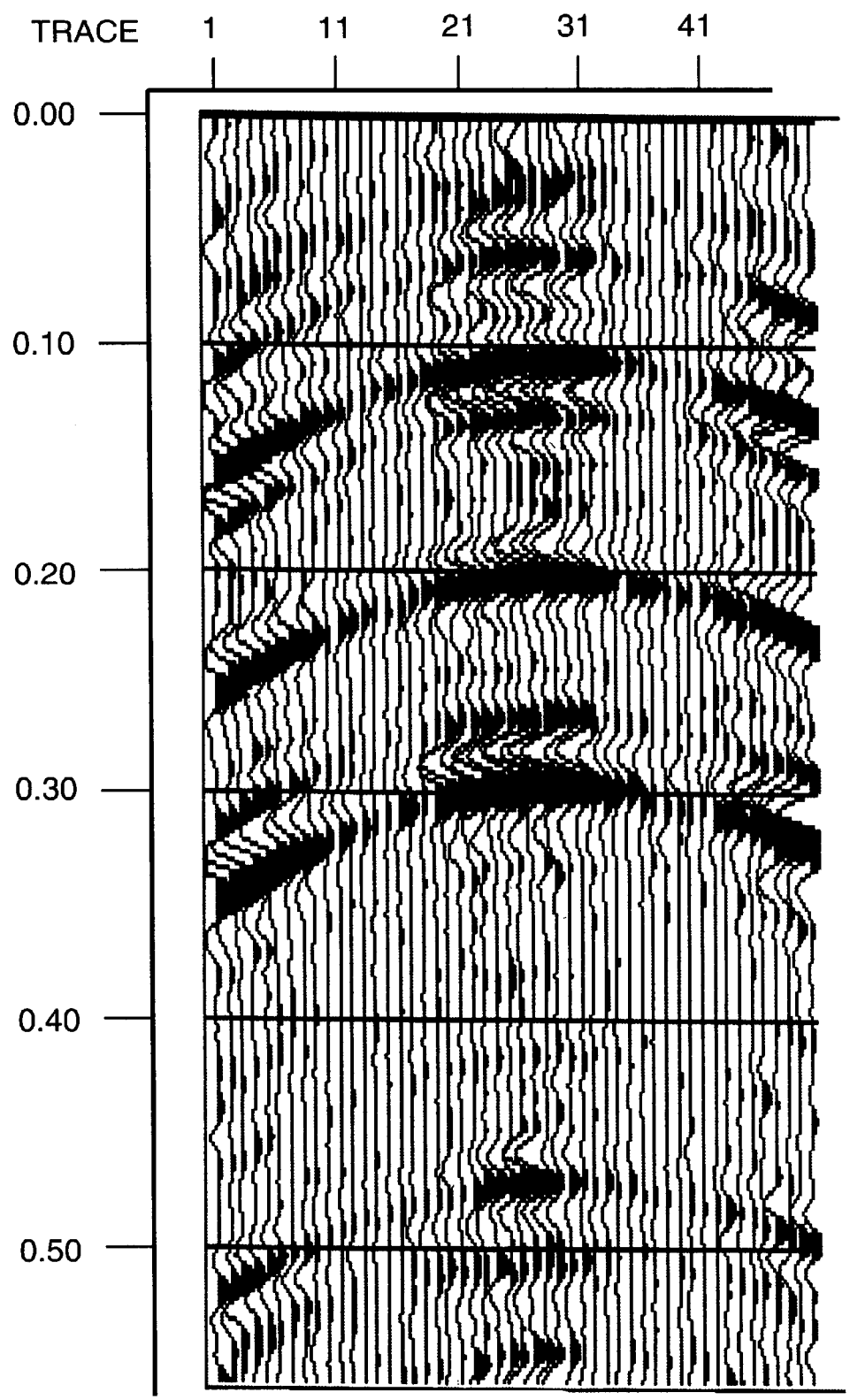
FIG. 3(a) is a 50-trace standard stack of CDP gathers, illustrating 50 pilot traces defined according to this invention.
Figure 3B:
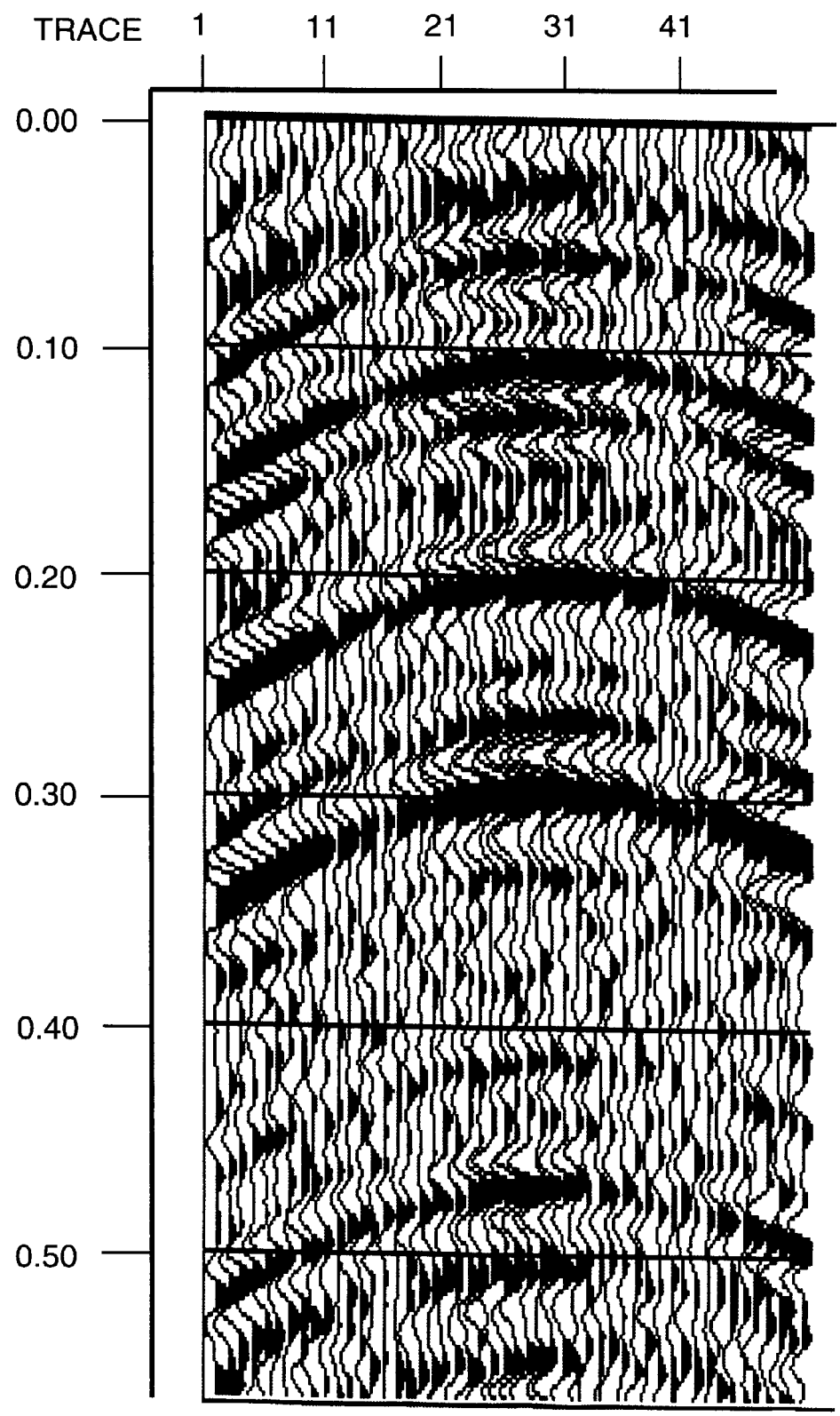
FIG. 3(b) is the same data as FIG. 3(a) after applying a trace muting scheme and RB-coherency stack according to this invention.

FIG. 3, having the same axis identification as FIG. 2, illustrates the improvement of the inventive noise filtering process of this invention. FIG. 3(a) is a 50-trace section illustrating a standard stack of CDP gathered traces of a seismic survey. FIG. 3(b) shows the same data after filtering by the processing steps of FIG. 1. The standard stack in FIG. 3(a) shows gaps in several horizons, e.g. traces 11–21 and 33–43 at about 0.075 seconds and traces 36–41 at about 0.12 seconds. Comparison of these areas in FIG. 3(a) with FIG. 3(b) show much better continuity of the horizons in these areas in FIG. 3(b). Of possibly greater interest, however, is the appearance in FIG. 3(b) of horizons in the broad area of from 0.35 to 0.55 seconds, where it is evident that the filtering process of this invention accentuates signals associated with low amplitude reflectors.

The invention as described and illustrated herein is an effective method and apparatus for noise filtering of seismic data traces. It will be recognized, however, that those skilled in the art will recognize that many modifications and variations of this invention are possible in light of the above teachings without departing from the spirit of the invention. It is understood that the present invention is not intended to be limited by the particular features described in detail and illustrated in the specification and drawings but the concept of this invention is to be measured by the scope of the appended claims.

That which is claimed is:

1. A computer program-implemented method for attenuating noise in a common depth point (CDP) gather of seismic data traces, said method comprising:

(a) stacking said gather of CDP seismic data traces after normal move out (NMO) has been applied to produce a standard stack;

(b) defining a pilot trace for said CDP gather based on said standard stack;

(c) comparing each trace in said CDP gather to said pilot trace to determine a numerical value representative of similarity of each trace in said CDP gather to said pilot trace;

(d) muting traces in said CDP gather lacking sufficient similarity to said pilot trace based on said numerical value determined in step (c); and (e) stacking the remaining unmuted traces in said CDP gather to attenuate noise in said CDP gather.

2. A method in accordance with claim 1, wherein said step (c) for comparing each trace in said CDP gather to said pilot trace to determine a numerical value representative of similarity comprises:

determining an RB-factor for each trace in said CDP gather when compared to said pilot trace.

3. A method in accordance with claim 2, wherein said RB-factor is a function of both shape and absolute amplitude difference of the waveforms being compared.

4. A method in accordance with claim 3, wherein said RB-factor is a function of the normalized absolute amplitude difference $D_{(a,b)}$ given in the expression:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

where:

$a_i$ and $b_i$ are amplitude components of the time series of the two waveforms being compared, and N is the length of the time series being compared.

5. A computer program-implemented method for attenuating noise in a common depth point (CDP) gather of seismic data traces, said method comprising:

(a) stacking said gather of CDP seismic data traces after normal move out (NMO) has been applied to produce a standard stack;

(b) defining a pilot trace for said gather based on said standard stack;

(c) comparing a corresponding segment of each trace in said CDP gather to a corresponding segment of said pilot trace using a time window centered about a time sample point for determining a plurality of RB-factors at said time sample point based on the number of traces in said CDP gather;

(d) muting said time sample point of each trace in said CDP gather falling below a user defined RB-factor threshold; and (e) stacking the remaining unmuted trace segments corresponding to said time sample point to attenuate noise in said CDP gather.

6. A method in accordance with claim 5, wherein said step (c) for comparing a corresponding segment of each trace in said CDP gather to a corresponding segment of said pilot trace comprises:

(i) aligning the center of a sliding time window with a beginning time sample of the CDP trace being compared to said pilot trace;

(ii) determining the RB-factor over the segment of traces included in said sliding time window, and associating the numerical value of said RB-factor with said beginning time sample point;

(iii) incrementing the position of said sliding time window to align the center of said window with an adjacent time sample point;

(iv) determining the RB-factor for the segment of traces included in said sliding time window at the incremented position, and associating the numerical value of said RB-factor with said adjacent time sample point; and (v) repeating said steps (i), (ii), (iii) and (iv) until RB-factors have been determined for all time samples of the traces being compared.

7. A method in accordance with claim 6, wherein RB-factors have been determined for all time samples of each trace in said CDP gather, said method additionally comprising:

ranking said plurality of time sample points according to their associated numerical RB-factors;

defining a threshold for said RB-factor based on said ranking; and muting all time sample points falling below said RB-factor threshold.

8. A method in accordance with claim 2, wherein the maximum number of traces in said CDP gather that can be muted is limited to a desired percent of the total traces in said CDP gather.

9. A method in accordance with claim 5, wherein the maximum number of said time sample points muted at any one position of said sliding time window is limited to a desired percent of the total traces in said CDP gather.

10. A method in accordance with claim 6, wherein said sliding time window comprises a time window of about twenty-eight milliseconds.

11. A method in accordance with claim 5, wherein said RB-factor is a function of both shape and absolute amplitude difference of the waveforms being compared.

12. A method in accordance with claim 5, wherein said RB-factor is a function of the normalized absolute amplitude difference $D_{(a,b)}$ given in the expression:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

where:

$a_i$ and $b_i$ are amplitude components of the time series of the two waveforms being compared, and N is the length of the time series being compared.

13. Apparatus for attenuating noise in a common depth point (CDP) gather of seismic data traces, said apparatus comprising:

a computer programmed to perform the following method steps:

(a) stacking said gather of CDP seismic data traces after normal move out (NMO) has been applied to produce a standard stack;

(b) determining a pilot trace for said gather based on said standard stack;

(c) comparing a corresponding segment of each trace in said CDP gather to a corresponding segment of said pilot trace using a time window centered about a time sample point for determining a plurality of RB-factors at said time sample point based on the number of traces in said CDP gather;

(d) muting said time sample point of each trace in said CDP gather falling below a user defined RB-factor threshold; and (e) stacking the remaining unmuted trace segments corresponding to said time sample point to attenuate noise in said CDP gather.

14. Apparatus in accordance with claim 13, wherein said step (c) for comparing a corresponding segment of each trace in said CDP gather to a corresponding segment of said pilot trace comprises:

(i) aligning the center of a sliding time window with a beginning time sample of the CDP trace being compared to said pilot trace;

(ii) determining the RB-factor over the segment of traces included in said sliding time window, and associating the numerical value of said RB-factor with said beginning time sample point;

(iii) incrementing the position of said sliding time window to align the center of said window with an adjacent time sample point;

(iv) determining the RB-factor for the segment of traces included in said sliding time window at the incremented position, and associating the numerical value of said RB-factor with said adjacent time sample point; and (v) repeating said steps (i), (ii), (iii) and (iv) until RB-factors have been determined for all time sample points of the traces being compared.

15. Apparatus in accordance with claim 14, wherein RB-factors have been determined for all time samples of each trace in said CDP gather, said method additionally comprising:

ranking said plurality of time sample points according to their associated numerical RB-factors;

defining a threshold for said RB-factor based on said ranking; and muting all time sample points falling below said RB-factor threshold.

16. Apparatus in accordance with claim 13, wherein said RB-factor is a function of both shape and absolute amplitude difference of the waveforms being compared.

17. Apparatus in accordance with claim 13, wherein said RB-factor is a function of the normalized absolute amplitude difference $D_{(a,b)}$ given in the expression:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

where:

$a_i$ and $b_i$ are amplitude components of the time series of the two waveforms being compared, and N is the length of the time series being compared.

18. A program storage device, readable by a computer, tangibly embodying a program of instructions executable by said computer for attenuating noise in common depth point (CDP) gather of seismic data traces, said method steps comprising:

(a) stacking said gather of CDP seismic data traces after normal move out (NMO) has been applied to produce a standard stack;

(b) defining a pilot trace for said gather based on said standard stack;

(c) comparing a corresponding segment of each trace in said CDP gather to a corresponding segment of said pilot trace using a time window centered about a time sample point for determining a plurality of RB-factors at said time sample point based on the number of traces in said CDP gather;

(d) muting said time sample point of each trace in said CDP gather falling below a user defined RB-factor threshold; and (e) stacking the remaining unmuted trace segments corresponding to said time sample point to attenuate noise in said CDP gather.

19. Apparatus in accordance with claim 18, wherein said step (c) for comparing a corresponding segment of each trace in said CDP gather to a corresponding segment of said pilot trace comprises:
   (i) aligning the center of a sliding time window with a beginning time sample of the CDP trace being compared to said pilot trace;
   (ii) determining the RB-factor over the segment of traces included in said sliding time window, and associating the numerical value of said RB-factor with said beginning time sample point;
   (iii) incrementing the position of said sliding time window to align the center of said window with an adjacent time sample point;
   (iv) determining the RB-factor for the segment of traces included in said sliding time window at the incremented position, and associating the numerical value of said RB-factor with said adjacent time sample point; and
   (v) repeating said steps (i), (ii), (iii) and (iv) until RB-factors have been determined for all time samples of the traces being compared.

20. Apparatus in accordance with claim 18, wherein said RB-factor is a function of the normalized absolute amplitude difference $D_{(a,b)}$ given in the expression:

$$D_{(a,b)} = \frac{\sum_{i=1}^{N}(|a_i|+|b_i|) - \sum_{i=1}^{N}|a_i - b_i|}{\sum_{i=1}^{N}(|a_i|+|b_i|)}$$

where:
   $a_i$ and $b_i$ are amplitude components of the time series of the two waveforms being compared, and
   N is the length of the time series being compared.

21. A method of accentuating seismic signals from low amplitude reflectors in a common-depth point (CDP) gather of traces, said method comprising:
   (a) stacking said gather of CDP seismic data traces after normal move out (NMO) has been applied to produce a standard stack;
   (b) determining a pilot trace for said gather based on said standard stack;
   (c) comparing a corresponding segment of each trace in said CDP gather to a corresponding segment of said pilot trace using a time window centered about a time sample point for determining a plurality of RB-factors at said time sample point based on the number of traces in said CDP gather;
   (d) muting said time sample point of each trace in said CDP gather falling below a user defined RB-factor threshold; and
   (e) stacking the remaining unmuted trace segments corresponding to said time sample point to accentuate signals from low amplitude reflectors in said CDP gather.

22. A method in accordance with claim 21, wherein said step (c) for comparing a corresponding segment of each trace in said CDP gather to a corresponding segment of said pilot trace comprises:
   (i) aligning the center of a sliding time window with a beginning time sample of the CDP trace being compared to said pilot trace;
   (ii) determining the RB-factor over the segment of traces included in said sliding time window, and associating the numerical value of said RB-factor with said beginning time sample point;
   (iii) incrementing the position of said sliding time window to align the center of said window with an adjacent time sample point;
   (iv) determining the RB-factor for the segment of traces included in said sliding time window at the incremented position, and associating the numerical value of said RB-factor with said adjacent time sample point; and
   (v) repeating said steps (i), (ii), (iii) and (iv) until RB-factors have been determined for all time samples of the traces being compared.

\* \* \* \* \*